Jan. 28, 1969      R. E. SULLIVAN      3,424,596
PACKAGE FOR STORING AND COOKING BACON SLICES
Filed Oct. 22, 1965

INVENTOR.
ROBERT E. SULLIVAN
BY Weingarten,
Orenbuch &
Lahive
ATTORNEYS

United States Patent Office 3,424,596
Patented Jan. 28, 1969

3,424,596
PACKAGE FOR STORING AND COOKING
BACON SLICES
Robert E. Sullivan, 128 Cliff Road,
Wellesley, Mass. 02181
Filed Oct. 22, 1965, Ser. No. 501,671
U.S. Cl. 99—174
Int. Cl. B65b 25/06
1 Claim

ABSTRACT OF THE DISCLOSURE

A package for storing and cooking bacon strips, in which the bacon slices are individually held in separate pockets within the package. The package includes a cover above the pockets and a drainage pan and basin below the pockets to catch drippings during cooking, each pocket having an opening to permit drippings to drain during cooking.

---

This invention relates to food packages which act as a storage container for the food and as a cooking vessel when the food is to be prepared. More particularly, the invention relates to a food package which is intended to be discarded, after the food has been cooked and served. Packages of this nature are generally referred to as "disposable" packages.

The invention may be used for any type of food which is stored and cooked in strip or flat form such as thin slices of beef, flat patties, and strips of bacon. As a matter of convenience, the term bacon is here used generically as an example of foods, whether of animal or vegetable nature, which are stored and cooked in flat form. In storing foods, such as bacon strips, which require refrigeration, it is customary, to place the strips one upon the other to conserve space. During refrigeration, the strips adhere to each other and form a mass that must first be thawed before the strips can be easily separated. The outer strips tend to thaw out first whereas the inner strips may still be frozen. Because the strips may be at different temperatures when they are placed upon a griddle, the strips, if they are removed at the same time, are not all cooked to the same degree. Furthermore, some bacon strips exhibit a tendency to curl when placed upon a hot griddle. Curling of the strip causes it to be unevenly heated so that while part of the strip is completely cooked, other portions may be uncooked or only partially cooked. Some foods, such as bacon, tend to be excessively fatty, and when heated release large amounts of liquefied fats and other juices which must be drained away during cooking or removed immediately after cooking to prevent the food from being "greasy." The removal of the hot drippings presents a hazard and is an unpleasant task. Because the hot drippings tend to splatter, removal of the bacon strips immediately after cooking may result in burns. It is, therefore, customary to allow the drippings to cool somewhat before removing the bacon from the griddle.

The invention resides in a package which permits the bacon strips to be stored in a compact manner in the package and yet, the strips do not, when refrigerated, come together to form a solid mass. Because of the manner in which the bacon strips are arranged in the package, a thawing period is not required and cooking can be commenced immediately upon removing the package from the refrigerator. The package has provisions for continuous drainage of the fats and juices which are released during cooking and is constructed to facilitate the neat and efficient disposal of the waste drippings. Further, the package is constructed to provide easy accessibility to the food so that it may be served immediately after it is cooked.

A package constructed in accordance with this invention utilizes a heat conductive separator folded in a manner permitting a strip of bacon to be separately disposed in each fold. The package has a basin or reservoir beneath the separator to catch and retain drippings which are released by the bacon during the cooking process and a cover is employed to protect the bacon during storage and to provide protection against spattering during cooking. It is contemplated that the cooking process will, in the manner customary with packaged frozen or refrigerated foods, be carried out at a predetermined temperature for a predetermined time in an oven or other heating enclosure so that the heat is evenly applied to the entire package. The package is arranged to permit the separator and the bacon strips to be easily removed immediately after cooking, leaving the waste drippings in the basin for later disposal.

These and other objects, advantages and features of the present invention will become apparent from the following detailed specification when read in conjunction with the accompanying drawings in which.

Figure 1:
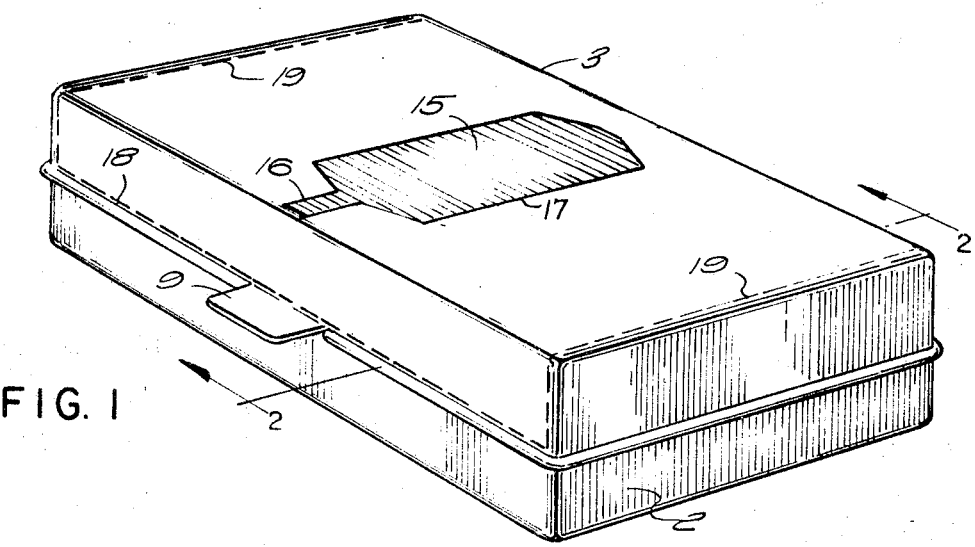
FIG. 1 is a perspective view of a preferred embodiment of the invention.
Figure 2:
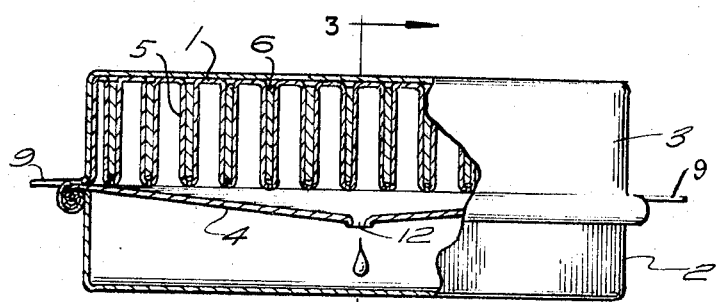
FIG. 2 is a cross-sectional view taken along the line 2—2 of FIG. 1.
Figure 3:
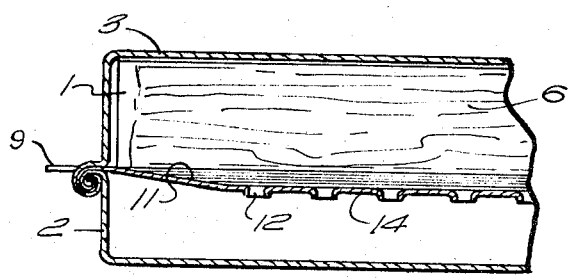
FIG. 3 is a partial cross-sectional view taken along the line 3—3 of FIG. 2.

Referring now to the drawings in which corresponding parts in the various figures are denoted by like reference numbers, FIGS. 1 to 4 depict a food package employing a folded heat conductive separator 1, a basin 2, a cover 3, and a drainage pan 4. Separator 1 is, preferably, a thin sheet of a metal such as copper or aluminum, which is characterized by good heat conductivity and is relatively inert to chemical reaction with the food contained in the package. The separator is folded in accordion fashion, forming a series of parallel pockets 5, each pocket being the receptacle for a strip of bacon 6. Preferably, separator 1 is so folded that an air space exists between adjacent pockets. However, it is not essential that an air space be provided between the pockets and where compactness is the prime consideration the pockets may abut each other. When placed in a freezer or refrigerator, the air space maintains the separation necessary to prevent the bacon strip and pockets from freezing together into a solid mass. When the package is heated to cook the bacon strips, the air space allows the heated air to have access to a large exposed surface of the separator whereby the bacon can be cooked very quickly. The sides 7 of pocket 5 are in contact with or in close proximity to the two large surfaces of the bacon strip, thus providing each bacon strip in the package with two large cooking areas. Materials, other than metals, having good thermal conductivity may be employed for the separator, but such materials must be relatively inert to chemical reaction with the bacon an ought not to impart and undesirable flavor to the food. At the bottom of each pocket of the separator are preferably a plurality, but at least one opening 8 which permits drainage of the drippings released by the bacon during cooking. If desired, drainage holes may also be provided in the sides 7. Tabs 9 are lateral extensions of the terminal folds 10 of the separator. The tabs provide a simple means for applying tension to the folded separator to cause it to unfold when it is desired to serve the cooked bacon. The package permits a relatively large number of bacon strips to be cooked simultaneously and evenly while the strips remain flatly encased in the pockets. Further, the package provides for the continuous drainage of the fats and juices released by the food while it is being cooked and the cooked food need not be removed from the package until it is ready to be served.

Basin 2 is simply a shallow pan, made of a suitable material such as a thin aluminum sheet, which is deep enough to store the drippings released by the food during cooking. Drainage pan 4, preferably made of a metal foil, is sloped to cause the drippings to drain toward the center where there are several openings 12 through which the drippings pass into basin 2. If desired, drainage pan 4 may be a flat sheet provided with a multitude of small apertures over its entire surface to permit the drippings to drop into the basin without having to run to the center of the pan. The drainage pan prevents the drippings from spattering onto the separator and acts as a cover for the basin after the top portion of the package has been removed. While the bacon is cooking, drippings fall through the holes in the separator onto drainage pan 4 and run along the inclined sides 11 of the pan to the holes 12, which are spaced along the bottom of the drainage pan, and down into basin 2. Drainage pan 4, at its periphery provides support for the folded separator 1 by forming a shelf 13 around the pan 4 upon which the separator rests. Drainage pan 4 is, preferably, attached to basin 2. The basin and drainage pan may be joined by rolling their edges together, as indicated by edge 14 in FIG. 4. Waste drippings in the basin are disposed of by pouring off the drippings while still liquid, or by discardiing the entire bottom part of the package along with its contents.

Cover 3 which, except for tabs 9, encloses separator 1 and the bacon strips, is preferably made of aluminum foil. The cover may be attached to basin 2 by being included in the rolled edge 14 and the cover is crimped around tabs 9 without being attached to them. A transparent window 15 is provided in the cover so that the edges of the bacon strips 6 are in view; the window permits a prospective purchaser to view the bacon contained in the package. Transparent window 15 may be removed for cooking by pulling tab 16 which causes cover 3 to tear along lines 17. The opening thus created in the cover serves to provide a vent during cooking. When it is desired to open cover 3 to permit serving of the bacon, tabs 9 are pulled in opposite directions, causing cover 3 to tear along lines 18. If it is desired to remove cover 3 completely, it may be torn along lines 18 and 19 where the material of the cover has been purposely weakened as by scoring. Otherwise, separator 1 may be removed by sliding it out from under cover 3.

Figure 4:
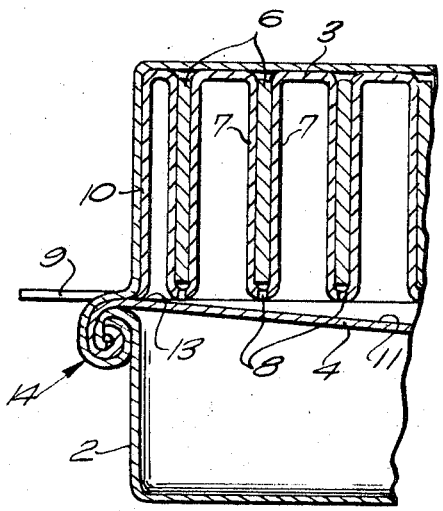
FIG. 4 is an enlarged view of a portion of FIG. 2.
Figure 5:
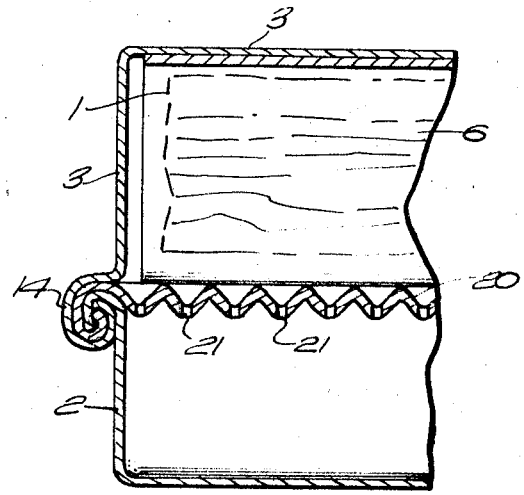
FIG. 5 is an enlarged view of a modification of the package illustrated in FIG. 3.

A modification of the invention is shown in FIG. 5, where drainage pan 20 is a folded metal sheet with drainage holes 21 at the bottom of each fold. The folds of drainage pan 20 are normal to the folds of metal sheet 1, thus providing a ribbed support for the separator 1 and its bacon strips. Pan 20 may be attached to basin 2 at rolled edge 14 in a manner similar to the way drainage pan 4 is attached as shown in FIG. 4.

Figure 6:
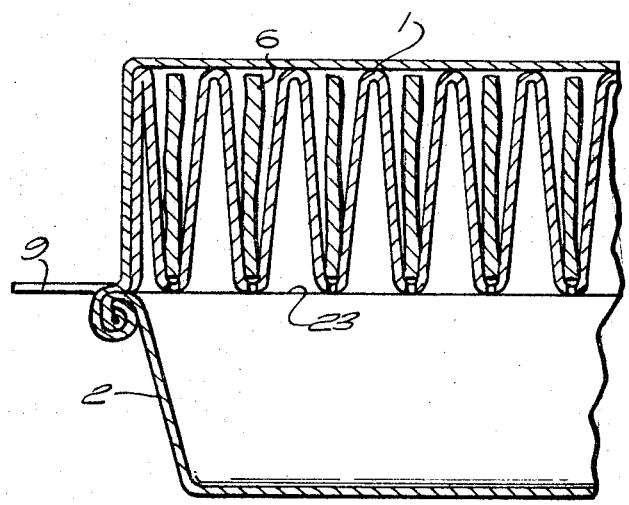
FIG. 6 is an enlarged view of a further modification of the package illustrated by FIG. 4.

Another modification is illustrated by FIG. 6 where there is no drainage pan but the separator 1 and its bacon strips 6 are supported on shelves 23, which are merely inward lateral extensions of the side of basin 2 from edge 14.

It is evident that many other modifications will occur to those skilled in the art which are within the scope of the appended claim. For example, the package may be for half-length or full-length bacon; the package may be made so that it is composed of a number of separable smaller portions for smaller family and individual needs; the folded metal strip 1 may be over-lapping in a horizontal or semihorizontal configuration; other than the suggested means may be employed for attaching and removing cover 3.

What is claimed is:

1. A package for storing and cooking a plurality of bacon strips, comprising a heat conducting separator sheet folded in accordion fashion to form a plurality of parallel pockets, each pocket containing substantially an entire strip of bacon, each pocket having at least one opening in its lower fold for gravity drainage of drippings, each pocket providing large area cooking surfaces for its strip of bacon tab, means for applying tension to the separator to cause it to unfold, a cover, the separator being substantially housed within the cover to protect the bacon from contamination during storage and to protect external surfaces from spattering during the cooking process, a drainage pan positioned below the separator, the drainage pan having at least one opening in its lower extremity for gravity drainage of drippings, and a basin disposed beneath the drainage pan for collection and retention of said drippings, said cover, drainage pan and basin being attached at their peripheral edges to form a generally sealed unitary package.

References Cited
UNITED STATES PATENTS

| | | | |
|---|---|---|---|
| 2,850,392 | 9/1958 | Gunsberg | 99—174 X |
| 3,361,576 | 1/1968 | Jacobson | 99—174 X |

HYMAN LORD, *Primary Examiner.*

U.S. Cl. X.R.

99—194